(12) United States Patent  
Mori et al.

(10) Patent No.: US 7,255,778 B2
(45) Date of Patent: Aug. 14, 2007

(54) ELECTROCHEMICAL MACHINING METHOD AND APPARATUS

(75) Inventors: Yuzo Mori, 8-16-19, Kisaichi, Katano-shi, Osaka (JP); Mitsuhiko Shirakashi, Fujisawa (JP); Yasushi Toma, Settsu (JP); Itsuki Kobata, Fujisawa (JP); Takayuki Saito, Hiratsuka (JP)

(73) Assignees: Ebara Corporation, Tokyo (JP); Yuzo Mori, Osaka (JP)

(*) Notice: Subject to any disclaimer, the term of this patent is extended or adjusted under 35 U.S.C. 154(b) by 689 days.

(21) Appl. No.: 10/828,346

(22) Filed: Apr. 21, 2004

(65) Prior Publication Data

US 2004/0195109 A1    Oct. 7, 2004

Related U.S. Application Data

(62) Division of application No. 09/897,913, filed on Jul. 5, 2001, now Pat. No. 6,743,349.

(30) Foreign Application Priority Data

Jul. 5, 2000 (JP) ............................. 2000-203786
Jan. 23, 2001 (JP) ............................... 2001-14477
Jun. 13, 2001 (JP) .............................. 2001-179340

(51) Int. Cl.
*C25D 17/00* (2006.01)
*C25F 3/16* (2006.01)
*B23H 3/08* (2006.01)

(52) U.S. Cl. ................. 204/224 M; 204/212; 205/652; 205/654; 205/668; 205/672

(58) Field of Classification Search ................ 204/212, 204/224 M, 205; 205/652, 654, 668, 672
See application file for complete search history.

(56) References Cited

U.S. PATENT DOCUMENTS

| 6,171,467 | B1 | 1/2001 | Weihs et al. |
| 6,368,493 | B1 | 4/2002 | Mori et al. |
| 6,875,335 | B2* | 4/2005 | Mori et al. ................. 205/652 |
| 2002/0033343 | A1 | 3/2002 | Mori et al. |

FOREIGN PATENT DOCUMENTS

EP    1 079 003    2/2001

(Continued)

OTHER PUBLICATIONS

Machine Translation of JP 2000-052235.

(Continued)

*Primary Examiner*—Roy King
*Assistant Examiner*—Nicholas A. Smith
(74) *Attorney, Agent, or Firm*—Wenderoth, Lind & Ponack, L.L.P.

(57) ABSTRACT

An electrochemical machining apparatus comprises a machining chamber for holding ultrapure water, a cathode/anode immersed in the ultrapure water held in the machining chamber, and a workpiece holding portion for holding a workpiece at a predetermined distance from the cathode/anode so that a surface, to be machined, of the workpiece is brought into contact with the ultrapure water. The electrochemical machining apparatus further comprises an anode/cathode contact brought into contact with the workpiece held by the workpiece holding portion so that the workpiece serves as an anode/cathode, a catalyst having a strongly basic anion exchange function or a strongly acidic cation exchange function, a power source for applying a voltage between the cathode/anode and the workpiece, and a moving mechanism for relatively moving the workpiece and the catalyst. The catalyst is disposed between the cathode/anode and the workpiece held by the workpiece holding portion.

17 Claims, 9 Drawing Sheets

FOREIGN PATENT DOCUMENTS

| | | |
|---|---|---|
| EP | 1139400 | 10/2001 |
| JP | 10-58236 | 3/1998 |
| JP | 2000-52235 | 2/2000 |
| JP | 2000-167714 | 6/2000 |
| WO | 00/34995 | 6/2000 |

OTHER PUBLICATIONS

Patent Abstracts of Japan, vol. 013, No. 144 (E-740), Apr. 10, 1989 & JP 63 306630 A (NEC Corp.), Dec. 14, 1988, abstract.

Patent Abstracts of Japan, vol. 018, No. 658 (E-1643), Dec. 13, 1994 & JP 06 260480 A (NEC Corp.), Sep. 16, 1994, abstract.

Patent Abstracts of Japan, vol. 014, No. 227 (C-0718), May 15, 1990 & JP 02 054800 A (Mitsubishi Electric Corp.), Feb. 23, 1990, abstract.

Chen et al., "Selective etching of silicon in aqueous KOH", Materials Science & Engineering B34, (1995), pp. 180-187.

* cited by examiner

ELECTROCHEMICAL MACHINING METHOD AND APPARATUS

This application is a Divisional Application of Ser. No. 09/897,913, filed Jul. 5, 2001, now U.S. Pat. No. 6,743,349.

BACKGROUND OF THE INVENTION

1. Field of the Invention:

The present invention relates to electrochemical machining method and apparatus using ultrapure water, and more particularly to electrochemical machining method and apparatus which can perform machining for removal, formation of an oxide film, or film formation of a workpiece, such as a semiconductor material or a metallic material, with the use of only ultrapure water as an electrolytic solution.

2. Description of the Related Art:

In recent years, the progress of technology has developed various new materials one after another. However, the machining technology useful for these new materials has not been established yet, and the development of the machining technology has followed the development of new materials.

Further, components in various types of equipments have become finer and have required higher accuracy. As submicronic manufacturing technology has commonly been used, the properties of materials are largely influenced by the machining method. Under these circumstances, in such a conventional machining method that a desired portion in a workpiece is physically destroyed and removed from the surface thereof by a tool, a large number of defects may be produced to deteriorate the properties of the workpiece. Therefore, it becomes important to perform machining without deteriorating the properties of the materials.

Some machining methods, such as chemical polishing, electrochemical machining, and electropolishing, have been developed in order to solve this problem. In contrast with the conventional physical machining, these methods perform machining for removal or the like by chemical elution. Therefore, in these methods, alteration of a machined layer due to plastic deformation and defects such as dislocation are not occurred, so that machining can be performed without deteriorating the properties of the materials.

Further, attention has been directed to a machining method utilizing interatomic chemical interaction. This method utilizes fine particles, radicals having highly chemical reactivity, and the like. According to this machining method, machining for removal or the like is performed by a chemical reaction with a workpiece on an atomic level. Therefore, machining can be controlled on an atomic level. This type of machining method includes elastic emission machining (EEM) and plasma chemical vaporization machining (CVM), which have been developed by the inventors. The EEM utilizes a chemical reaction between fine particles and a workpiece, and can realize machining on an atomic level without deteriorating the properties of materials. On the other hand, the plasma CVM utilizes a radical reaction between a workpiece and radicals produced in plasma at atmospheric pressure, and can realize machining on an atomic level.

In the aforementioned electrochemical machining and electropolishing, it is considered that machining proceeds through electrochemical interaction between a workpiece atom and an electrolyte ion in an electrolytic solution (an aqueous solution of NaCl, NaNO$_3$, HF, HCl, HNO$_3$, NaOH, or the like). The contamination of the workpiece with the electrolytic solution is unavoidable as long as the electrolytic solution is used.

Accordingly, the inventors have considered that, in neutral and alkaline electrolytic solutions, machining is related to hydroxide ions (OH$^-$). This consideration has led to such an idea that machining can be performed even with water containing a small number of hydroxide ions. The inventors have experimentally confirmed the feasibility of this technology, and have proposed a method of increasing the ionic product in ultrapure water, in which a small number of unavoidable impurities is contained, as disclosed in Japanese laid-open Patent Publication No. 10-58236.

According to the above method, a workpiece is immersed in ultrapure water having an increased concentration of the hydroxide ion, and machining for removal or oxide film formation is performed through a chemical elution or an oxidation reaction with the hydroxide ions. Further, the inventors have also proposed the utilization of an electrochemical reaction on the surface of a solid having an ion exchange function or catalytic function to increase the number of the hydroxide ion. As a result, there has been developed a novel machining method which can realize machining in a clean manner without leaving impurities on the machined surface through the utilization of hydroxide ions in ultrapure water. This machining method has been expected to be used in wide applications including the field related with semiconductor manufacturing. Thus, the inventors have proposed a machining method using ultrapure water as an electrolytic solution, which is a low-damage machining method utilizing a chemical reaction, and a clean and low-environmental load machining method.

SUMMARY OF THE INVENTION

The present invention has been made in view of the above drawbacks. It is therefore a first object of the present invention to provide electrochemical machining method and apparatus which use ultrapure water as an electrolytic solution and can efficiently perform machining for removal of a material such as aluminum and iron.

It is a second object of the present invention to provide electrochemical machining method and apparatus which use ultrapure water as an electrolytic solution and, even in the case of a material such as aluminum and silicon, can realize not only machining for formation of an oxide film, but also machining for removal.

It is a third object of the present invention to provide electrochemical machining apparatus and method which can further improve accuracy of machining a workpiece.

In order to attain the first object, according to a first aspect of the present invention, there is provided an electrochemical machining method comprising: disposing a workpiece as an anode and a cathode in ultrapure water in such a state that a predetermined space is formed between the workpiece and the cathode; disposing a catalyst having an anion exchange function between the workpiece and the cathode; and relatively moving the workpiece and the catalyst while a voltage is applied between the workpiece and the cathode.

Thus, electrochemical machining is performed in ultrapure water in such a state that the workpiece serves as an anode, and a catalyst having an anion exchange function is used. Accordingly, machining for removal can efficiently be performed even with a material, such as aluminum and iron, which has been difficult to be machined for removal. Further, machining can stably be performed by increasing a flow rate of the ultrapure water flowing between the workpiece and the cathode as the counter electrode.

According to a preferred aspect of the present invention, the workpiece is selected from the group consisting of aluminum, iron, and copper.

According to a second aspect of the present invention, there is provided an electrochemical machining apparatus comprising: a machining chamber for holding ultrapure water; a cathode immersed in the ultrapure water held in the machining chamber; a workpiece holding portion for holding a workpiece at a predetermined-distance from the cathode so that a surface, to be machined, of the workpiece is brought into contact with the ultrapure water; an anode contact brought into contact with the workpiece held by the workpiece holding portion so that the workpiece serves as an anode; a catalyst having an anion exchange function, the catalyst being disposed between the cathode and the workpiece held by the workpiece holding portion; a power source for applying a voltage between the cathode and the workpiece; and a moving mechanism for relatively moving the workpiece and the catalyst.

In order to attain the second object of the present invention, according to a third aspect of the present invention, there is provided an electrochemical machining method comprising: disposing a workpiece as a cathode and an anode in ultrapure water in such a state that a predetermined space is formed between the workpiece and the anode; disposing a catalyst for dissociating water molecules into hydrogen ions and hydroxide ions, between the workpiece and the anode; and applying a voltage between the workpiece and the anode.

Thus, electrochemical machining is performed in ultrapure water in such a state that the workpiece serves as a cathode. Accordingly, machining for removal can be realized even with a large of number materials, such as silicon or aluminum, which have been mainly machined for film formation and difficult to be machined for removal in the case where the workpiece serves as an anode.

According to a preferred aspect of the present invention, the workpiece and the anode are relatively moved while a voltage is applied between the workpiece and the anode.

Thus, the relative movement of the workpiece and the anode can increase the flow rate of the ultrapure water flowing between the workpiece and the anode as the counter electrode, so that stable electrochemical machining can be realized.

According to a fourth aspect of the present invention, there is provided an electrochemical machining apparatus comprising: a machining chamber for holding ultrapure water; an anode immersed in the ultrapure water held in the machining chamber; a workpiece holding portion for holding a workpiece at a predetermined distance from the anode so that a surface, to be machined, of the workpiece is brought into contact with the ultrapure water; a cathode contact brought into contact with the workpiece held by the workpiece holding portion so that the workpiece serves as a cathode; a catalyst disposed between the anode and the workpiece held by the workpiece holding portion for dissociating water molecules into hydrogen ions and hydroxide ions; and a power source for applying a voltage between the anode and the workpiece.

According to a preferred aspect of the present invention, the catalyst is a nonwoven fabric having an ion exchange function. This nonwoven fabric may be prepared in such a manner that graft chains are introduced into a nonwoven fabric having a proper fiber diameter and porosity with the use of the so-called radiation-induced graft polymerization, which comprises the gamma irradiation and the graft polymerization, for example. A cloth made of ion exchange fibers or a net into which an ion exchange group is introduced can be used as the catalyst member.

It is advantageous that the nonwoven fabric is brought into contact with the anode or the workpiece (cathode) from the viewpoint of increasing the current value. When the reaction products are likely to stay between the electrodes. and the nonwoven fabric, and electrochemical machining may be performed unevenly over the machined surface, the electrochemical machining can be performed evenly over the machined surface by increasing the flow rate of the ultrapure water. In order to immediately remove the reaction products from the workpiece or the anode, a space may be formed between the nonwoven fabric and the electrodes, particularly between the nonwoven fabric and the workpiece.

According to another preferred aspect of the present invention, an ion exchange group in the nonwoven fabric having an ion exchange function is selected from the group consisting of anion exchange groups and cation exchange groups. The machining rate for removal and film formation can be controlled by changing the ion exchange fabric.

In order to attain the third object of the present invention, according to a fifth aspect of the present invention, there is provided an electrochemical machining apparatus comprising: a machining chamber for holding ultrapure water; a rotatable holding portion for detachably holding a workpiece so as to immerse the workpiece in the ultrapure water held in the machining chamber; a machining electrode immersed in the ultrapure water held in the machining chamber, the machining electrode being disposed at a predetermined distance from the workpiece held by the holding portion; a catalyst disposed between the workpiece held by the holding portion and the machining electrode for dissociating water molecules present between the machining electrode and the workpiece into hydrogen ions and hydroxide ions; a power source for applying a voltage between the machining electrode and the workpiece; and an ultrapure water supply nozzle for supplying ultrapure water between the machining electrode and the workpiece from the upstream side of a direction of rotation of the machining electrode.

With this arrangement, the surface roughness of the machined surface can be reduced. The reason for this is considered as follows: The ultrapure water is supplied between the machining electrode and the workpiece from the upstream side of the direction of rotation of the machining electrode, for thereby effectively removing gas bubbles and machining products, which has been difficult to be removed by simply rotation of the machining electrode, from the machined surface. Thus, the factors that prevent the flattening of the workpiece can be eliminated. Further, the deposition of fibers, which is a phenomenon specific to the use of a strongly acidic cation exchange fiber as the catalyst, can be prevented.

According to a sixth aspect of the present invention, there is provided an electrochemical machining apparatus comprising: a machining chamber for holding ultrapure water; a rotatable holding portion for detachably holding a workpiece so as to immerse the workpiece in the ultrapure water held in the machining chamber; a rotatable machining electrode immersed in the ultrapure water held in the machining chamber, the machining electrode being disposed at a predetermined distance from the workpiece held by the holding portion; a catalyst disposed between the workpiece held by the holding portion and the machining electrode for dissociating water molecules present between the machining electrode and the workpiece into hydrogen ions and hydroxide ions; and a power source for applying a voltage between the machining electrode and the workpiece; wherein the machining electrode has at least one of a columnar shape and a cylindrical shape, and a shaft center in a direction parallel to a plane of rotation of the workpiece held by the holding portion.

When only the machining electrode is rotated, machining traces in the direction of movement of the machining electrode are formed upon machining. With the above arrangement, the machining traces can be removed from the machined surface.

According to a seventh aspect of the present invention, there is provided an electrochemical machining apparatus comprising: a machining chamber for holding ultrapure water; a rotatable holding portion for detachably holding a workpiece so as to immerse the workpiece in the ultrapure water held in the machining chamber; a rotatable machining electrode immersed in the ultrapure water held in the machining chamber, the machining electrode being disposed at a predetermined distance from the workpiece held by the holding portion; a catalyst disposed between the workpiece held by the holding portion and the machining electrode for dissociating water molecules present between the machining electrode and the workpiece into hydrogen ions and hydroxide ions; and a power source for applying a voltage between the machining electrode and the workpiece; wherein the machining electrode has at least one of an elliptical shape and a spherical shape, and a shaft center in a direction parallel to a plane of rotation of the workpiece held by the holding portion.

With this arrangement, the surface roughness of the machined surface can be reduced. The reason for this is considered that the area of the machining portion is so small that the ultrapure water can easily be supplied to a portion around the machining portion to perform machining under stable conditions.

In these cases, the electrochemical machining apparatus should preferably comprise an ultrapure water circulation/purification device for purifying the ultrapure water held in the machining chamber to circulate the ultrapure water; and a high-pressure ultrapure water supply unit for supplying high-pressure ultrapure water to the ultrapure water supply nozzle.

According to an eighth aspect of the present invention, there is provided an electrochemical machining method comprising: disposing a machining electrode and a workpiece in ultrapure water in such a state that a predetermined space is formed between the machining electrode and the workpiece; disposing a catalyst for dissociating water molecules into hydrogen ions and hydroxide ions, between the machining electrode and the workpiece; applying a voltage between the machining electrode and the workpiece; and supplying ultrapure water between the machining electrode and the workpiece from the upstream side of a direction of rotation of at least one of the machining electrode and the workpiece while at least one of the machining electrode and the workpiece is being rotated.

According to a ninth aspect of the present invention, there is provided an electrochemical machining method comprising: disposing a machining electrode and a workpiece in ultrapure water in such a state that a predetermined space is formed between the machining electrode and the workpiece; disposing a catalyst for dissociating water molecules into hydrogen ions and hydroxide ions, between the machining electrode and the workpiece; applying a voltage between the machining electrode and the workpiece; and simultaneously rotating the machining electrode and the workpiece while the machining electrode and the workpiece are brought into line contact with each other.

According to a tenth aspect of the present invention, there is provided an electrochemical machining method comprising: disposing a machining electrode and a workpiece in ultrapure water in such a state that a predetermined space is formed between the machining electrode and the workpiece; disposing a catalyst for dissociating water molecules into hydrogen ions and hydroxide ions, between the machining electrode and the workpiece; applying a voltage between the machining electrode and the workpiece; and simultaneously rotating the machining electrode and the workpiece while the machining electrode and the workpiece are brought into point contact with each other.

The above and other objects, features, and advantages of the present invention will be apparent from the following description when taken in conjunction with the accompanying drawings which illustrates preferred embodiments of the present invention by way of example.

DETAILED DESCRIPTION OF THE PREFERRED EMBODIMENTS

An electrochemical machining apparatus according to a first embodiment of the present invention will be described below with reference to FIGS. 1 through 4.

Figure 1:
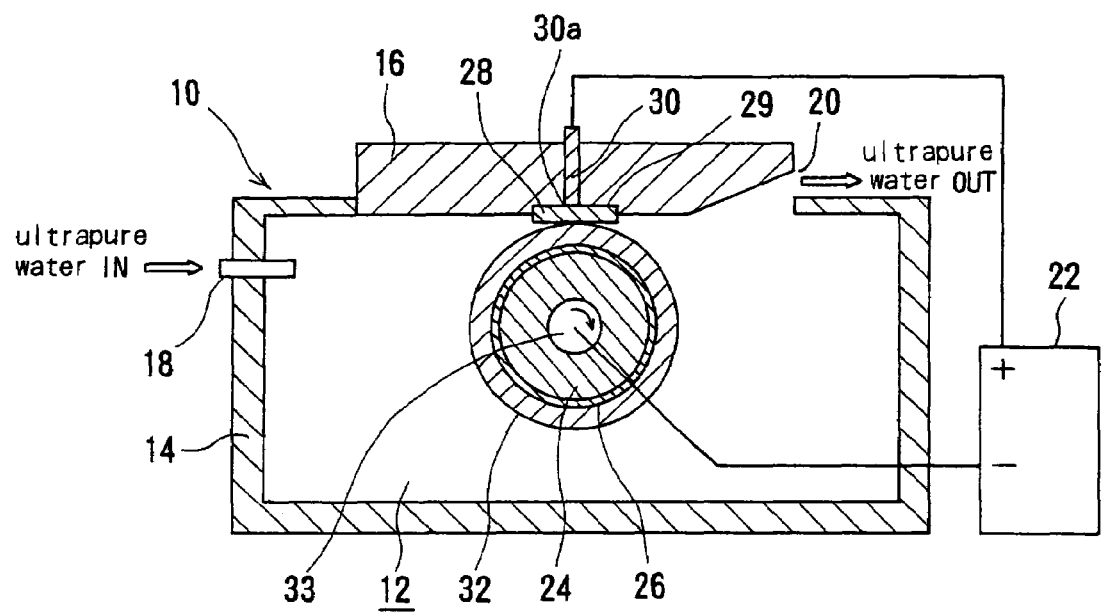
FIG. 1 is a cross-sectional view schematically showing an electrochemical machining apparatus according to a first embodiment of the present invention.

FIG. 1 is a schematic view showing an electrochemical machining apparatus according to a first embodiment of the present invention. The electrochemical machining apparatus 10 comprises a machining chamber 14, for example, made of an acrylic resin, for holding ultrapure water 12 therein, a cover 16 for closing and opening an opening portion of an upper end of the machining chamber 14, and an ultrapure water supply pipe 18 for supplying the ultrapure water 12 into the machining chamber 14. An ultrapure water outlet 20 for discharging a portion of the ultrapure water 12 into the outside of the machining chamber 14 is provided between the machining chamber 14 and the cover 16.

A cathode 24 extended from a power source 22 is rotatably disposed within the machining chamber 14. The cathode 24 comprises a rotating electrode made of stainless steel, for example. The surface of the cathode 24 is covered with a surface coating 26 such as a platinum foil so as to avoid the elution of the cathode 24. On the other hand, a workpiece holding portion 29 for detachably holding a workpiece 28 such as aluminum is provided on the backside of the cover 16. Further, an anode electrode 30 extended from the power source 22 is mounted on the cover 16. Thus, when the workpiece 28 is held on the backside of the cover 16, the anode electrode 30 and the workpiece 28 come into contact with each other at an anode contact 30a, so that the workpiece 28 serves as an anode.

A nonwoven fabric (catalyst) 32 having a strongly basic anion exchange function is mounted on the surface of the cathode 24 so as to be brought into close contact with the surface of the cathode 24. When the workpiece 28 is held on the backside of the cover 16 and the opening portion of the upper end of the machining chamber 14 is closed by the cover 16, the upper end of the nonwoven fabric 32 is brought into contact with the lower surface (surface to be machined) of the workpiece 28. The nonwoven fabric 32 and the workpiece 28 brought in contact with the nonwoven fabric 32 are relatively rotated (moved) by a rotating mechanism (moving mechanism) 33 mounted on the cathode 24.

For example, the nonwoven fabric 32 having a strongly basic anion exchange function can be prepared as follows: Graft chains are introduced into a polyolefin nonwoven fabric having a fiber diameter of 20 to 50 μm and a porosity of about 90% with the use of the so-called radiation-induced graft polymerization, which comprises the gamma irradiation and the graft polymerization. Then, the introduced graft chains are aminated to introduce the quaternary ammonium group for thereby forming a nonwoven fabric having a strongly basic anion exchange function. The capacity of the introduced ion exchange group is determined according to the amount of graft chain introduced. The ion exchange capacity of this nonwoven fabric is 1 to 1.45 meq/g, for example. A cloth made of strongly basic anion exchange fibers or a net into which a strongly basic anion exchange group is introduced can be used as the catalyst member.

According to the purpose of machining or the properties of the workpiece 28, the workpiece 28 may be separated from the nonwoven fabric 32 to form a space between the nonwoven fabric 32 and the workpiece 28. Alternatively, the nonwoven fabric 32 may be mounted on the workpiece 28, and the cathode 24 may be separated from the nonwoven fabric 32 to form a space between the nonwoven fabric 32 and the cathode 24.

With the electrochemical machining apparatus thus constructed, the ultrapure water 12 is supplied into the machining chamber 14 through the ultrapure water supply pipe 18. While a portion of the ultrapure water 12 is discharged from the ultrapure water outlet 20 into the outside of the machining chamber 14, the power source 22 is connected to the cathode 24 and the workpiece 28 as the anode to apply a voltage between the electrodes 24, 28. Simultaneously, the nonwoven fabric 32 is rotated together with the cathode 24 as needed. Water molecules in the ultrapure water 12 are dissociated into hydroxide ions and hydrogen ions through the action of the nonwoven fabric 32 having a strongly basic anion exchange function. The hydroxide ions are supplied onto the surface of the workpiece 28 through the flow of the ultrapure water 12 and the electric field between the workpiece 28 and the cathode 24. As a result, the density of the hydroxide ions around the workpiece 28 is increased to cause a reaction of workpiece atoms with the hydroxide ions. The reaction product is eluted into the ultrapure water 12 and removed from the workpiece 28 by the flow of the ultrapure water 12 along the surface of the workpiece 28. Thus, a surface layer is removed from the workpiece 28.

As described above, a flow of the ultrapure water 12 is formed within the machining chamber 14 and is passed through the nonwoven fabric 32 to produce a large number of hydrogen ions and hydroxide ions. The ions are supplied onto the surface of the workpiece 28 to realize highly efficient machining. A clean oxide film may be formed on the surface of the workpiece by an oxidation reaction of workpiece atoms with the hydroxide ions. In this case, a desired shape of the workpiece can be obtained by accumulation of the oxide film.

When the cathode (rotating electrode) 24 is rotated, the ultrapure water 12 can effectively be replaced with new ultrapure water between the workpiece 28 as the anode and the cathode 24 as the counter electrode. As a result, gas and machining products produced upon machining can effectively be removed from the machined surface to realize stable machining. In order to increase the flow-velocity of the ultrapure water at the machining point, the electrode (in this case, the cathode 24) may be rotated, or a means for producing a flow of the ultrapure water at the machining point, such as a pump, may be provided.

According to the present invention, since any chemical material other than ultrapure water is not used, what contaminates the machining chamber 14 is only the reaction products produced in the machining process. Circulation of the ultrapure water can reduce the amount of waste water. Further, since it is not necessary to treat chemical liquids, the operation cost can remarkably be reduced.

Furthermore, machining products produced in machining are forcibly sucked at the downstream side of the machining portion to keep the machining atmosphere clean. Furthermore, the ultrapure water is constantly replaced with new ultrapure water through the overflow, and the ultrapure water 12 held within the machining chamber 14 is purified with a separate ultrapure water purification device (not shown).

EXAMPLE 1

The electrochemical machining apparatus shown in FIG. 1 was used to perform machining for removal of aluminum (Al). A lower surface (surface to be machined) of the sample, which faced ultrapure water, had a size of 12.5 mm×34 mm. Within the lower surface of the sample, only a portion having a size of 12.5 mm×8 mm was exposed to and brought into contact with the ultrapure water. The other portion was masked with a polyether ether ketone (PEEK) material. Conditions of machining are listed in Table 1 below. The relationship between the current density and the machining rate in this case is shown as a line of "anode/anion fiber" in FIG. 2.

TABLE 1

| Conditions of Machining | |
|---|---|
| Period of Voltage Application | 600 sec |
| Rotational Speed | 200 rpm |
| Gap | 0 mm |

Further, machining for removal of aluminum was performed in the same arrangement and machining conditions as described above except that the electrodes in the power source were reversed, i.e., the workpiece was used as the cathode. The relationship between the current density and the machining rate in this case is shown as a line of "cathode/anion fiber" in FIG. 2.

Furthermore, machining for removal of aluminum was performed in the same arrangement and machining conditions as described above except that the workpiece was used as the cathode and a nonwoven fabric having a strongly acidic cation exchange function was used instead of the nonwoven fabric having a strongly basic anion exchange function. The relationship between the current density and the machining rate in this case is shown as a line of "cathode/cation fiber" in FIG. 2.

Figure 2:
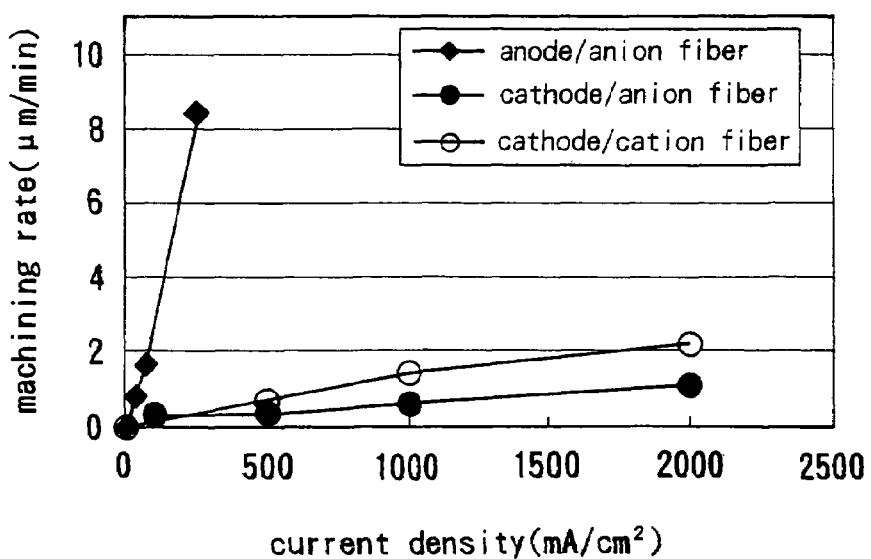
FIG. 2 is a graph showing the relationship between the current density and the machining rate with the electrochemical machining apparatus shown in FIG. 1 to perform machining for removal of aluminum, in cases where a workpiece was disposed as a cathode and a nonwoven fabric having a cation exchange function or an anion exchange function was used, and in a case where a workpiece was disposed as an anode and a nonwoven fabric having an anion exchange function was used instead of a nonwoven fabric having a cation exchange function.

As is apparent from FIG. 2, in machining for removal of aluminum, when the workpiece is used as an anode with a nonwoven fabric having a strongly basic anion exchange function, remarkably higher machining rate can be achieved, compared with that in the cases where the workpiece is used as a cathode with a nonwoven fabric having a strongly basic anion exchange function or a strongly acidic cation exchange function.

EXAMPLE 2

The electrochemical machining apparatus described in Example 1 was used to perform machining for removal of iron (Fe) under the same machining conditions as used in Example 1. The relationship between the current density and the machining rate in this case is shown as a line of "anode/anion fiber" in FIG. 3.

Further, machining for removal of iron was performed in the same arrangement and machining conditions as described above except that a nonwoven fabric having a strongly acidic cation exchange function was used instead of the nonwoven fabric having a strongly basic anion exchange function. The relationship between the current density and the machining rate in this case is shown as a line of "anode/cation fiber" in FIG. 3.

Figure 3:
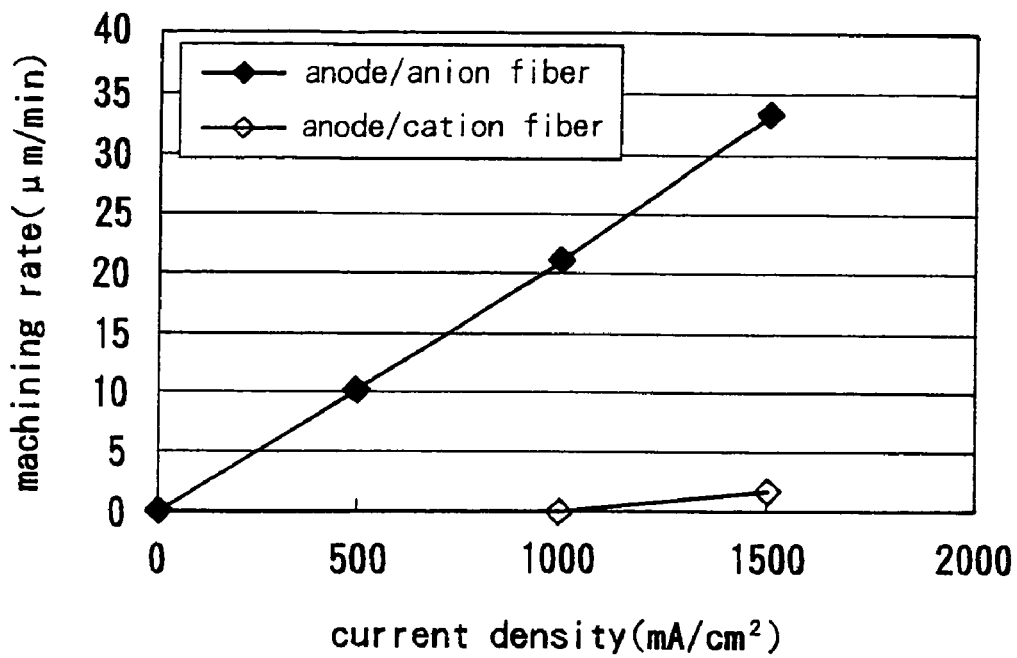
FIG. 3 is a graph showing the relationship between the current density and the machining rate with the electrochemical machining apparatus shown in FIG. 1 to perform machining for removal of iron, in a case where a nonwoven fabric having a strongly basic anion exchange function was used instead of a nonwoven fabric having a strongly acidic cation exchange function.

As is apparent from FIG. 3, in machining for removal of iron, when the workpiece is used as an anode with a nonwoven fabric having a strongly basic anion exchange function, the machining rate becomes 10 to 20 times higher than that in the case where a nonwoven fabric having a strongly acidic cation exchange function is used.

EXAMPLE 3

The electrochemical machining apparatus described in Example 1 was used to perform machining for removal of copper (Cu) under the same machining conditions as used in Example 1. The relationship between the current density and the machining rate in this case is shown as a line of "anode/anion fiber" in FIG. 4.

Further, machining for removal of copper was performed in the same arrangement and machining conditions as described above except that a nonwoven fabric having a strongly acidic cation exchange function was used instead of the nonwoven fabric having a strongly basic anion exchange function. The relationship between the current density and the machining rate in this case is shown as a line of "anode/cation fiber" in FIG. 4.

Figure 4:
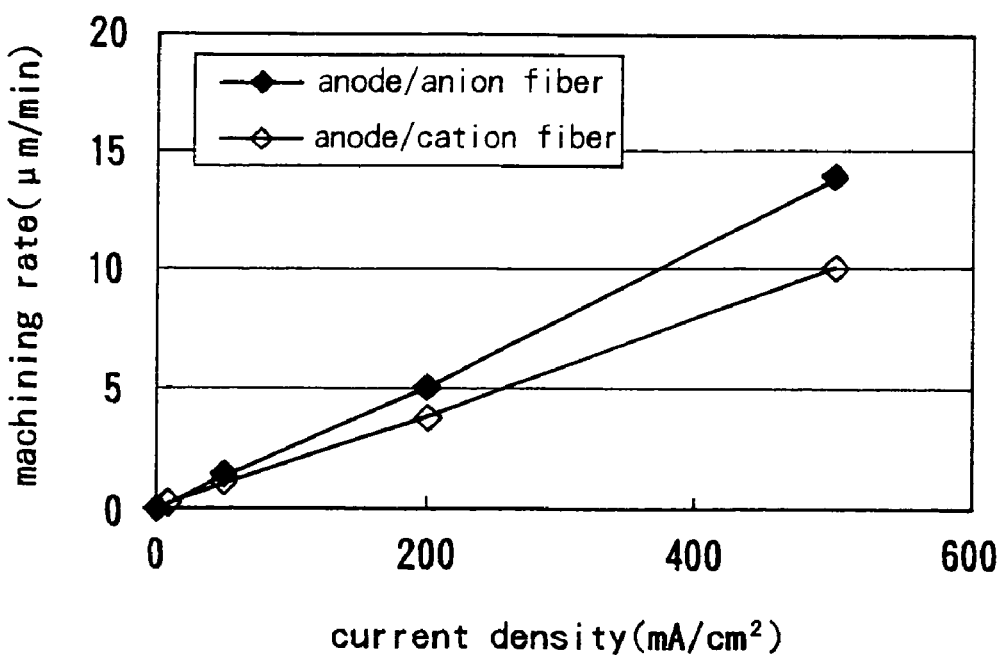
FIG. 4 is a graph showing the relationship between the current density and the machining rate with the electrochemical machining apparatus shown in FIG. 1 to perform machining for removal of copper, in a case where a nonwoven fabric having a strongly basic anion exchange function was used instead of a nonwoven fabric having a strongly acidic cation exchange function.

As is apparent from FIG. 4, in machining for removal of copper, when the workpiece is used as an anode with a nonwoven fabric having a strongly basic anion exchange function, the machining rate becomes about 1.5 times higher than that in the case where a nonwoven fabric having a strongly acidic cation exchange function is used.

As described above, according to the present invention, machining for removal can efficiently be performed by using a nonwoven fabric having an anion exchange function even with a material, such as aluminum and iron, which has been difficult to be machined for removal by using a nonwoven fabric having a cation exchange function. Moreover, since machining is performed by the electrochemical action between hydrogen and hydroxide ions and workpiece atoms, the properties of the workpiece can be prevented from being deteriorated due to physical defects caused during the machining process. Further, unlike an aqueous solution commonly used in a conventional electrochemical machining method, ultrapure water contains only hydrogen ions, hydroxide ions, and water molecules and has no impurities such as metal ions. Therefore, if impurities are completely prevented from entering the system from the outside, machining in a completely clean atmosphere can be realized. Furthermore, since only ultrapure water is used, a load on the waste water treatment can extremely be small, and the machining cost can remarkably be reduced.

An electrochemical machining apparatus according to a second embodiment of the present invention will be described below with reference to FIGS. 5 through 10.

Figure 5:
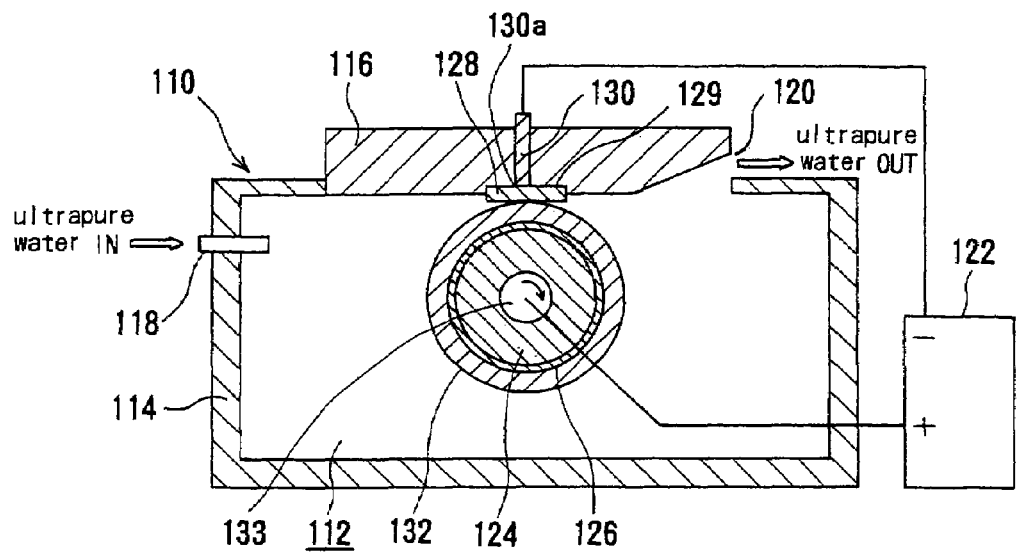
FIG. 5 is a cross-sectional view schematically showing an electrochemical machining apparatus according to a second embodiment of the present invention.

FIG. 5 is a schematic view showing an electrochemical machining apparatus according to a second embodiment of the present invention. The electrochemical machining apparatus 110 comprises a machining chamber 114, for example, made of an acrylic resin, for holding ultrapure water 112 therein, a cover 116 for closing and opening an opening portion of an upper end of the machining chamber 114, and an ultrapure water supply pipe 118 for supplying the ultrapure water 112 into the machining chamber 114. An ultrapure water outlet 120 for discharging a portion of the ultrapure water 112 into the outside of the machining chamber 114 is provided between the machining chamber 114 and the cover 116.

An anode 124 extended from a power source 122 is rotatably disposed within the machining chamber 114. The anode 124 comprises a rotating electrode made of stainless steel, for example. The surface of the anode 124 is covered with a surface coating 126 such as a platinum foil so as to avoid the elution of the anode 124. On the other hand, a workpiece holding portion 129 for detachably holding a workpiece 128 such as silicon is provided on the backside of the cover 116. Further, a cathode electrode 130 extended from the power source 122 is mounted on the cover 116. Thus, when the workpiece 128 is held on the backside of the cover 116, the cathode electrode 130 and the workpiece 128 come into contact with each other at a cathode contact 130a, so that the workpiece 128 serves as a cathode.

A nonwoven fabric (catalyst) 132 having an ion exchange function is mounted on the surface of the anode 124 so as to be brought into close contact with the surface of the anode 124. When the workpiece 128 is held on the backside of the cover 116 and the opening portion of the upper end of the machining chamber 114 is closed by the cover 116, the upper end of the nonwoven fabric 132 is brought into contact with the lower surface (surface to be machined) of the workpiece 128. The nonwoven fabric 132 and the workpiece 128 brought in contact with the nonwoven fabric 132 are relatively rotated (moved) by a rotating mechanism (moving mechanism) 133 mounted on the anode 124.

For example, the nonwoven fabric 132 can be prepared in such a manner that graft chains are introduced into a nonwoven fabric having a proper fiber diameter and porosity with the use of the so-called radiation-induced graft polymerization, which comprises the gamma irradiation and the graft polymerization, for example. A cloth made of ion exchange fibers or a net into which an ion exchange group is introduced can be used as the catalyst member. The ion exchange group of the nonwoven fabric 132 having an ion exchange function comprises a strongly basic anion exchange group or a strongly acidic cation exchange group.

According to the purpose of machining or the properties of the workpiece 128, the workpiece 128 may be separated from the nonwoven fabric 132 to form a space between the nonwoven fabric 132 and the workpiece 128. Alternatively, the nonwoven fabric 132 may be mounted on the workpiece 128, and the anode 124 may be separated from the nonwoven fabric 132 to form a space between the nonwoven fabric 132 and the anode 124.

With the electrochemical machining apparatus thus constructed, the ultrapure water 112 is supplied into the machining chamber 114 through the ultrapure water supply pipe 118. While a portion of the ultrapure water 112 is discharged from the ultrapure water outlet 120 into the outside of the machining chamber 114, the power source 122 is connected to the anode 124 and the workpiece 128 as the cathode to apply a voltage between the electrodes 124, 128. Simultaneously, the anode 124 is rotated as needed. Hydrogen ions and hydroxide ions are produced by a chemical reaction occurring on the solid surface of the nonwoven fabric 132 having an ion exchange function to perform machining for removal or formation of an oxide film. A flow of the ultrapure water 112 is formed within the machining chamber 114 and is passed through the nonwoven fabric 132 to produce a large number of hydrogen ions and hydroxide ions. The ions are supplied onto the surface of the workpiece 128 to realize highly efficient machining.

When the anode (rotating electrode) 124 is rotated, the ultrapure water 112 can effectively be replaced with new ultrapure water between the workpiece 128 as the cathode and the anode 124 as the counter electrode. As a result, gas and machining products produced upon machining can effectively be removed from the machined surface to realize stable machining. In order to increase the flow velocity of the ultrapure water at the machining point, the electrode (in this case, the anode 124) may be rotated, or a means for producing a flow of the ultrapure water at the machining point, such as a pump, may be provided.

According to the present invention, since any chemical material other than ultrapure water is not used, what contaminates the machining chamber 114 is only the reaction products produced in the machining process. Circulation of the ultrapure water can reduce the amount of waste water. Further, since it is not necessary to treat chemical liquids, the operation cost can remarkably be reduced.

Furthermore, machining products produced in machining are forcibly sucked at the downstream side of the machining portion to keep the machining atmosphere clean. Furthermore, the ultrapure water is constantly replaced with new ultrapure water through the overflow, and the ultrapure water 12 held within the machining chamber 114 is purified with a separate ultrapure water purification device (not shown).

EXAMPLE 4

The electrochemical machining apparatus shown in FIG. 5 was used to perform machining of silicon. Silicon used was p-type silicon having a specific resistance of 11.5 to 15.5 $\Omega \cdot cm$. A lower surface (surface to be machined) of the sample, which faced ultrapure water, had a size of 12.5 mm×34 mm. Within the lower surface of the sample, only a portion having a size of 12.5 mm×8 mm was exposed to and brought into contact with the ultrapure water. The other portion was masked with a polyether ether ketone (PEEK) material. A nonwoven fabric (anion fiber) having a strongly basic anion exchange function was used as a catalyst material for promoting dissociation of water molecules. Conditions of machining are listed in Table 2 below. The relationship between the machining rate and the rotational speed of the anode was measured with respect to three levels of the current density. The results are shown in FIG. 6.

TABLE 2

| Conditions of Machining | |
| --- | --- |
| Constant Current | 30 mA/cm$^2$ |
| | 100 mA/cm$^2$ |
| | 300 mA/cm$^2$ |
| Period of Voltage Application | 30 min |
| Catalyst Material | Anion Fiber |
| Rotational Speed | 0 to 250 rpm |
| Gap | 0 mm |

Figure 6:
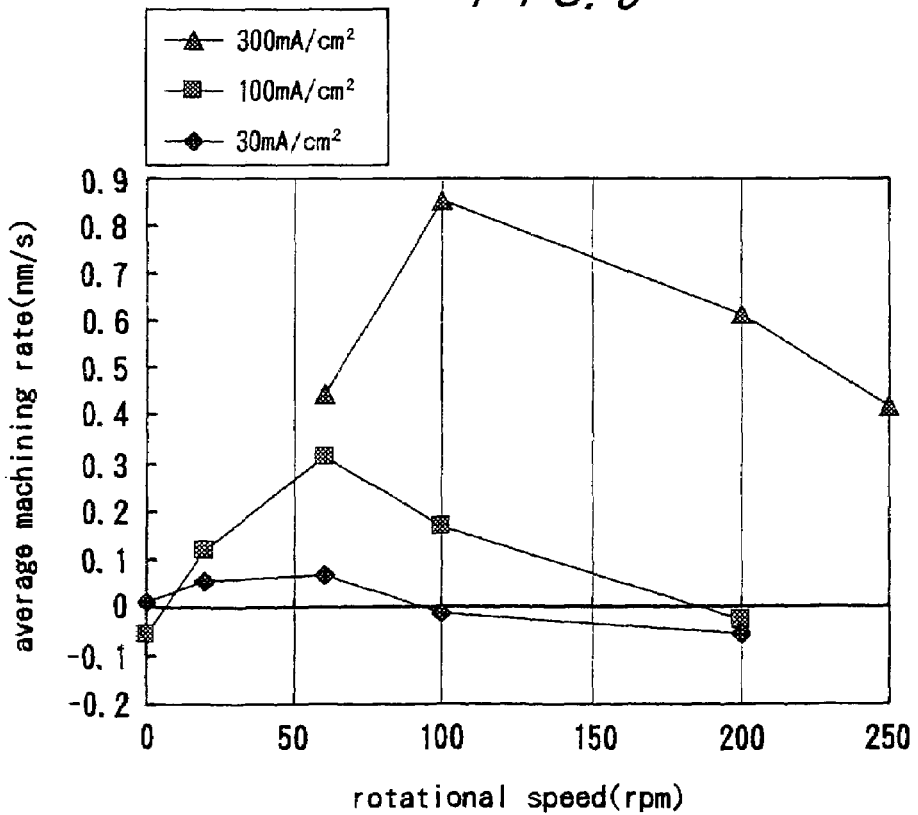
FIG. 6 is a graph showing the relationship between the rotational speed and the machining rate in machining of p-type silicon with the electrochemical machining apparatus shown in FIG. 5.

As shown in FIG. 6, when the rotational speed of the anode was 0 rpm (100 mA/cm$^2$) or 200 rpm (30 mA/cm$^2$, 100 mA/cm$^2$), an oxide film was formed on the surface of the workpiece. When the rotational speed of the anode was in the range of 20 to 150 rpm, machining for removal of silicon could be performed. Specifically, for silicon, when the workpiece (silicon) is used as the anode, machining for formation of an oxide film is mainly performed. However, when the workpiece (silicon) was used as the cathode, and the current density and the rotational speed of the anode were properly adjusted, both of machining for formation of a film and machining for removal could be performed.

COMPARATIVE EXAMPLE 1

The electrochemical machining apparatus shown in FIG. 5 was used to perform machining of silicon without application of voltage between the electrodes, i.e., without electric current, while the anode was being rotated at 60 rpm. In this case, the surface of silicon did not change, and neither machining for formation of a film nor machining for removal was performed. This shows that the principle of machining for removal according to the present invention does not rely on simple mechanical machining, and an electrochemical reaction caused by application of voltage contributes to the machining phenomenon.

COMPARATIVE EXAMPLE 2

The similar machining was performed under the conditions where a nonwoven fabric having a strongly acidic cation exchange function was used as the catalyst material for promoting dissociation of water molecules, instead of the nonwoven fabric having a strongly basic anion exchange function. In this case, the surface of silicon did not substantially change, and neither machining for formation of a film nor machining for removal was performed. This shows that the machining phenomenon according to the present invention depends upon not only electrical polarity of the workpiece, but also the type of nonwoven fabric having an ion exchange function.

COMPARATIVE EXAMPLE 3

Figure 7:
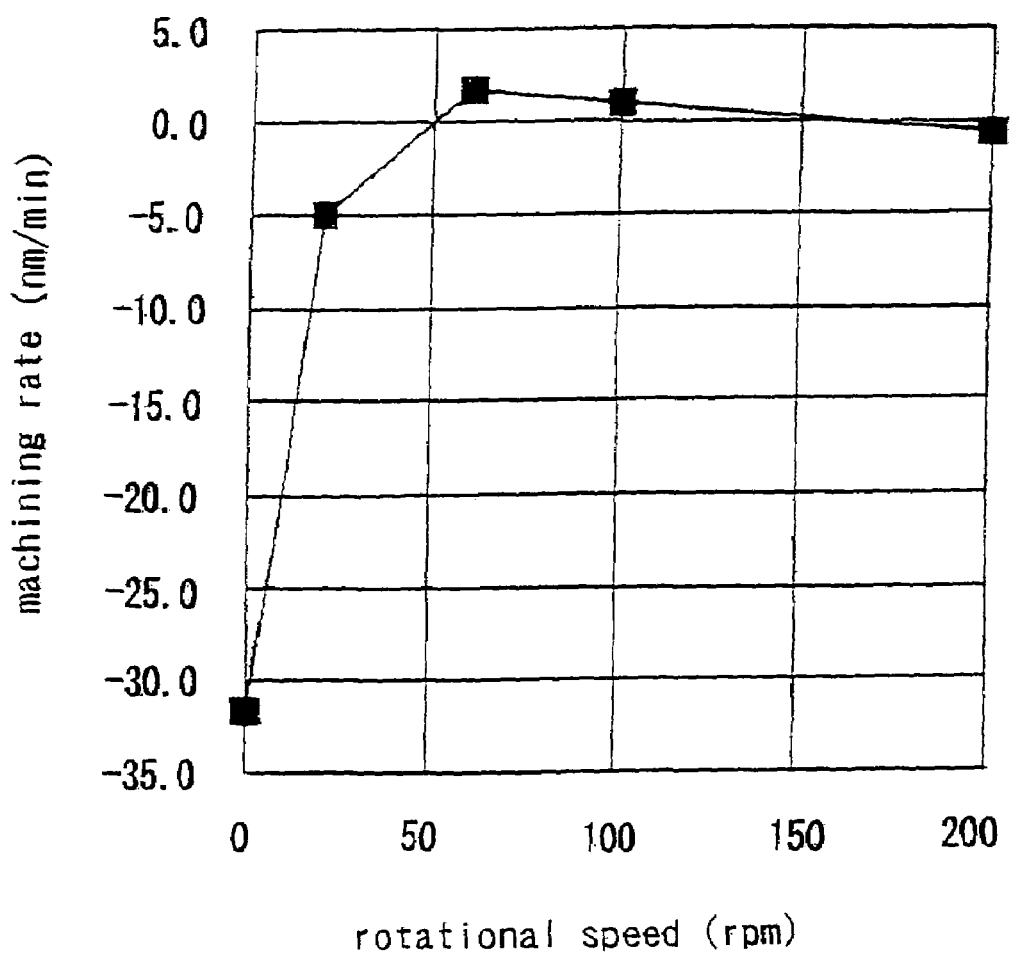
FIG. 7 is a graph showing the relationship between the rotational speed and the machining rate in machining with a nonwoven fabric having a strongly acidic cation exchange function instead of a nonwoven fabric having a strongly basic anion exchange function.

The similar machining was performed under the conditions listed in Table 3 below. A nonwoven fabric having a strongly acidic cation exchange function was used for promoting dissociation of water molecules, instead of the nonwoven fabric having a strongly basic anion exchange function. The relationship between the machining rate and the rotational speed of the anode was measured. The results are shown in FIG. 7. As shown in FIG. 7, when the rotational speed of the anode was 0, 20, and 200 rpm, the surface of silicon was oxidized. On the other hand, when the rotational speed of the anode was 60 and 100 rpm, machining for removal could be performed, and the machining rate was 10 times as small as that in the case where a nonwoven fabric having a strongly basic anion exchange function was used.

TABLE 3

| Conditions of Machining | |
| --- | --- |
| Constant Current | 100 mA/cm$^2$ |
| Period of Voltage Application | 90 min |
| Catalyst Material | Cation Fiber |
| Rotational Speed | 0 to 200 rpm |
| Gap | 0 mm |

EXAMPLE 5

Instead of the p-type silicon used in Example 1, n-type silicon having substantially the same specific resistance as the p-type silicon used in Example 1 was used as the workpiece, and machining was performed under the machining conditions listed in Table 4 below. In this case, the relationship between the machining rate and the rotational speed of the anode at a current density of 100 mA/cm$^2$ was measured. The results are shown in FIG. 8, in comparison with the results obtained for the p-type silicon.

TABLE 4

| Conditions of Machining | |
| --- | --- |
| Constant Current | 100 mA/cm$^2$ |
| Period of Voltage Application | 30 min |
| Catalyst Material | Anion Fiber |
| Rotational Speed | 0 to 200 rpm |
| Gap | 0 mm |

Figure 8:
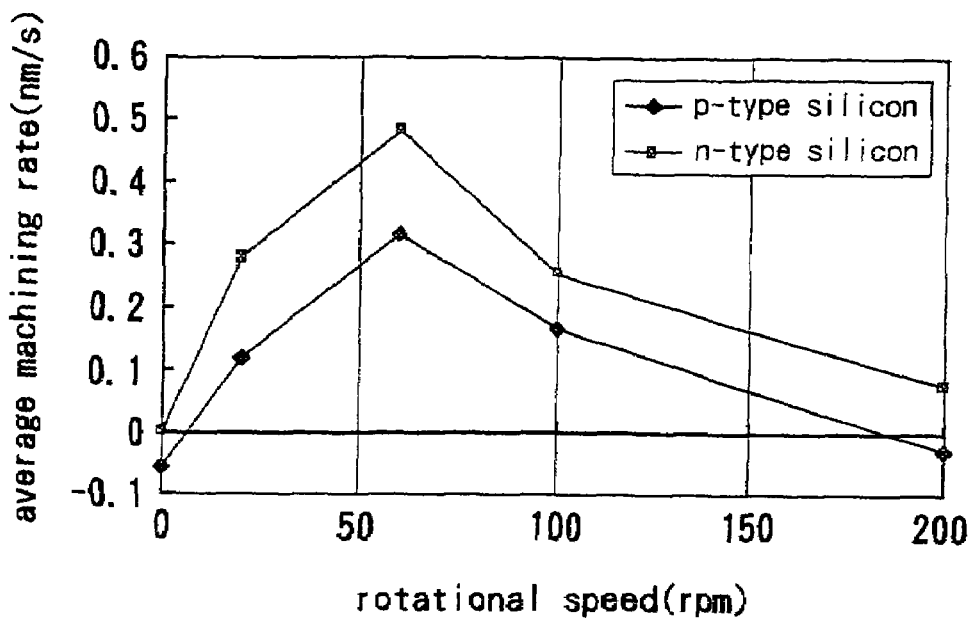
FIG. 8 is a graph showing the relationship between the rotational speed and the machining rate in machining of n-type silicon with the electrochemical machining apparatus shown in FIG. 5, in comparison with the results of machining of p-type silicon.

As is apparent from FIG. 8, comparison under substantially the same current density and rotational speed shows such a tendency that the machining rate of removal for the n-type silicon is higher than that for the p-type silicon.

EXAMPLE 6

Figure 9:
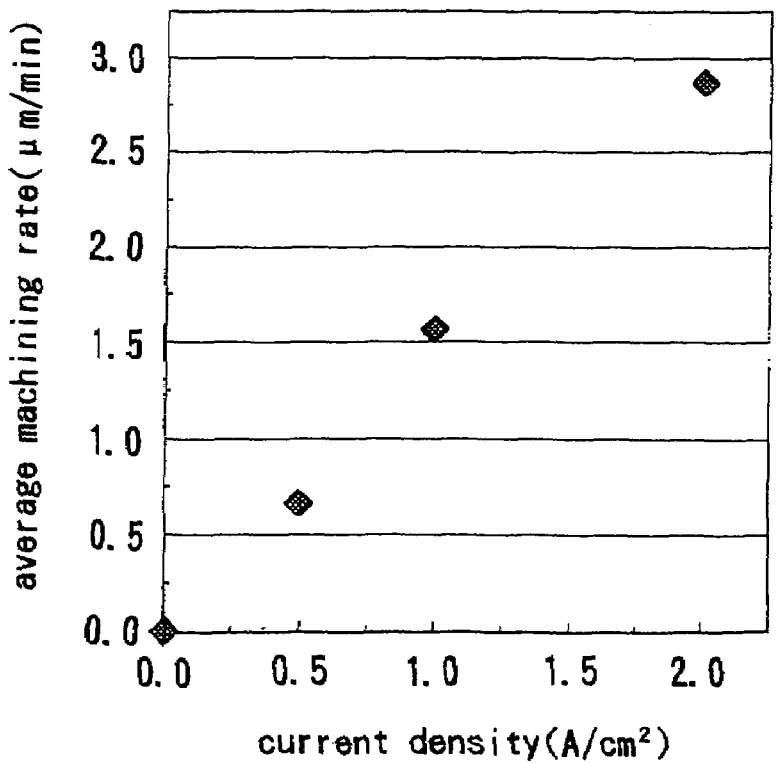
FIG. 9 is a graph showing the relationship between the rotational speed and the machining rate in machining for removal of aluminum with a cation exchange fiber as a catalyst in the electrochemical machining apparatus shown in FIG. 5.
Figure 10:
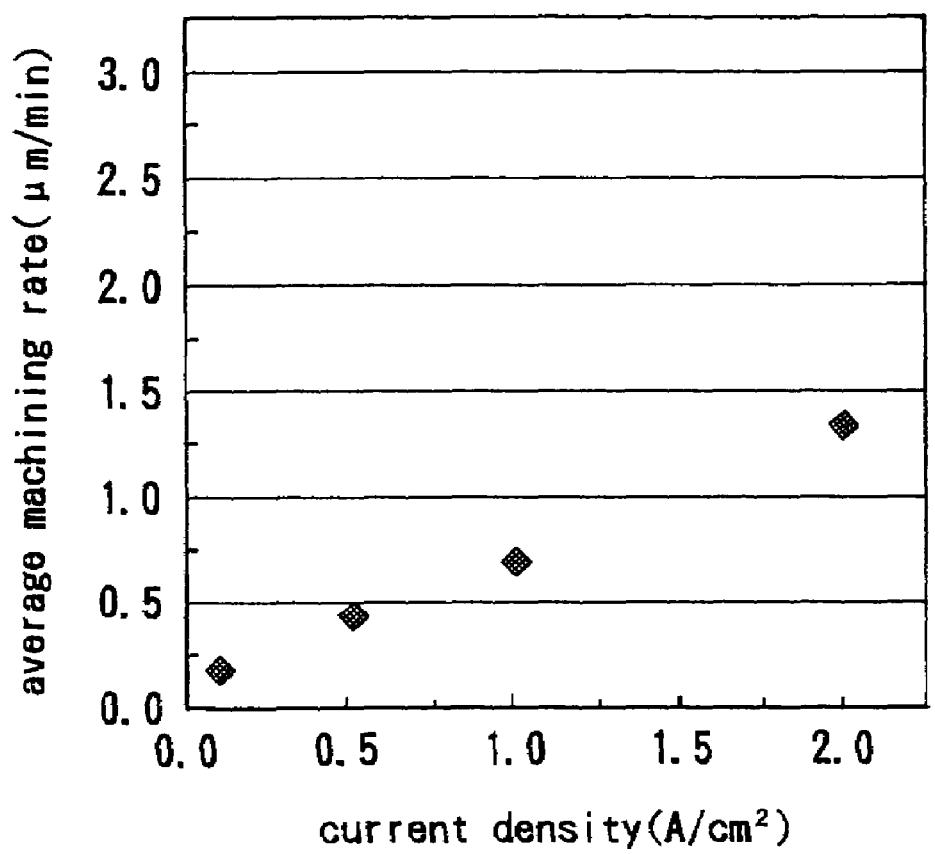
FIG. 10 is a graph showing the relationship between the rotational speed and the machining rate in machining for removal of aluminum using an anion exchange fiber as a catalyst in the electrochemical machining apparatus shown in FIG. 5.

The electrochemical machining apparatus described in Example 4 was used to perform machining for removal of aluminum which is used as a workpiece in the cathode under the machining conditions listed in Table 5 below. FIG. 9 shows the relationship between the current density and the machining rate in the case where a nonwoven fabric (cation exchange fiber) having a strongly acidic cation exchange function was used as the catalyst material. FIG. 10 shows the relationship between the current density and the machining rate in the case where a nonwoven fabric (anion exchange fiber) having a strongly basic anion exchange function was used as the catalyst material. The nonwoven fabric having an acidic cation exchange function was prepared as follows: Graft chains were introduced into a polyolefin nonwoven fabric having a fiber diameter of 20 to 50 μm and a porosity of about 90% with the use of the so-called radiation-induced graft polymerization, which comprises the gamma irradiation and the graft polymerization. Then, the introduced graft chains were sulfonated to introduce the sulfonic acid group for thereby forming a nonwoven fabric having an acidic cation exchange function. The ion exchange capacity of this nonwoven fabric was 2.8 meq/g.

| Conditions of Machining | |
| --- | --- |
| Catalyst Material | Cation Exchange Fiber |
|  | Anion Exchange Fiber |
| Metal as Workpiece | Aluminum |
| Current Density | 0 A/cm$^2$ |
|  | 0.5 A/cm$^2$ |
|  | 1.0 A/cm$^2$ |
|  | 2.0 A/cm$^2$ |
| Period of Voltage Application | 600 sec |
| Rotational Speed | 200 rpm |
| Gap | 0 mm |

As is apparent from FIGS. 9 and 10, when machining for removal is performed, the machining rate is substantially proportional to the current density. It is considered that machining for removal is performed through the same reaction independently of the current density.

Table 6 shows the difference of machining phenomenon performed with the different types of ion exchange material used, including the results obtained for silicon. Based on a change in mass and the surface profile (height difference between a machined portion and a non-machined portion), it was judged which type of machining phenomenon (machining for removal or machining for film formation) was performed.

TABLE 6

| Strongly Basic Anion Exchange Nonwoven Fabric | Strongly Acidic Cation Exchange Nonwoven Fabric |
|---|---|
| Al | ○ | ○ |
| Si | ○ | ● |

Note)
○: Machining for Removal
●: Machining for Film Formation

When aluminum or silicon is used as the workpiece in the anode, machining for film formation is mainly performed. However, as is apparent from Table 6, when aluminum or silicon is used as the workpiece in the cathode, machining for removal can be performed.

As described above, according to the second embodiment of the present invention, when materials such as silicon and aluminum, which has been difficult to be machined for removal and film formation is mainly performed, are used as the cathode, machining for removal can be performed. Further, the machining rate of removal or film formation can be controlled by controlling the current density and the rotational speed (relative movement speed) or varying the catalyst (nonwoven fabric).

Since machining is performed by the electrochemical reaction between hydrogen and hydroxide ions and workpiece atoms, the properties of the workpiece can be prevented from being deteriorated due to physical defects caused during the machining process. Further, unlike an aqueous solution commonly used in a conventional electrochemical machining method, ultrapure water contains only hydrogen ions, hydroxide ions, and water molecules and has no impurities such as metal ions. Therefore, if impurities are completely prevented from entering the system from the outside, machining in a completely clean atmosphere can be realized. Furthermore, since only ultrapure water is used, a load on the waste water treatment can extremely be small, and the machining cost can remarkably be reduced.

An electrochemical machining apparatus according to a third embodiment of the present invention will be described below with reference to FIGS. 11 through 14.

When the workpiece and the machining electrode are disposed in parallel with each other and are not moved relative to each other, machining products or gas bubbles produced upon machining stay between the electrodes. As a result, the surface roughness of the workpiece after machining becomes disadvantageously larger than the surface roughness before machining. This problem can be solved to some extent by rotating the counter electrode (machining electrode) to intensively remove the machining products and the gas bubbles which stay between the electrodes. Nevertheless, waviness or undulation at pitches of about 100 μm along the direction of the rotation, etch pits having a diameter of 1 μm to 10 μm, and traces (machining traces) of ion exchange fibers are formed on the machined surface. Accordingly, the surface roughness is as large as about 100 nm by center line average height (Ra). Such problems can be solved by an electrochemical machining apparatus according to a third embodiment of the present invention described below.

Figure 11:
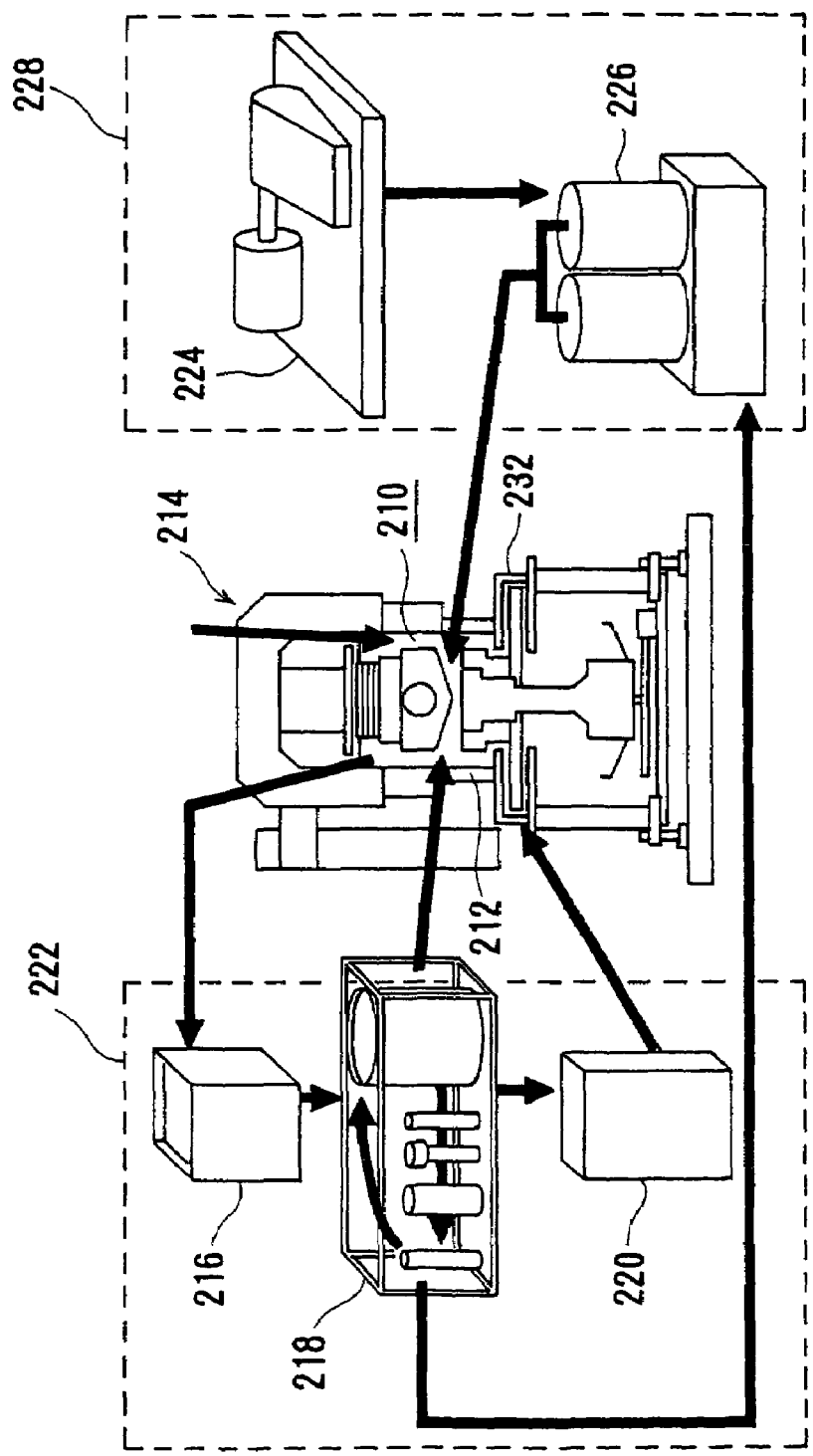
FIG. 11 is a schematic view showing the whole construction of an electrochemical machining apparatus according to a third embodiment of the present invention.
Figure 12:
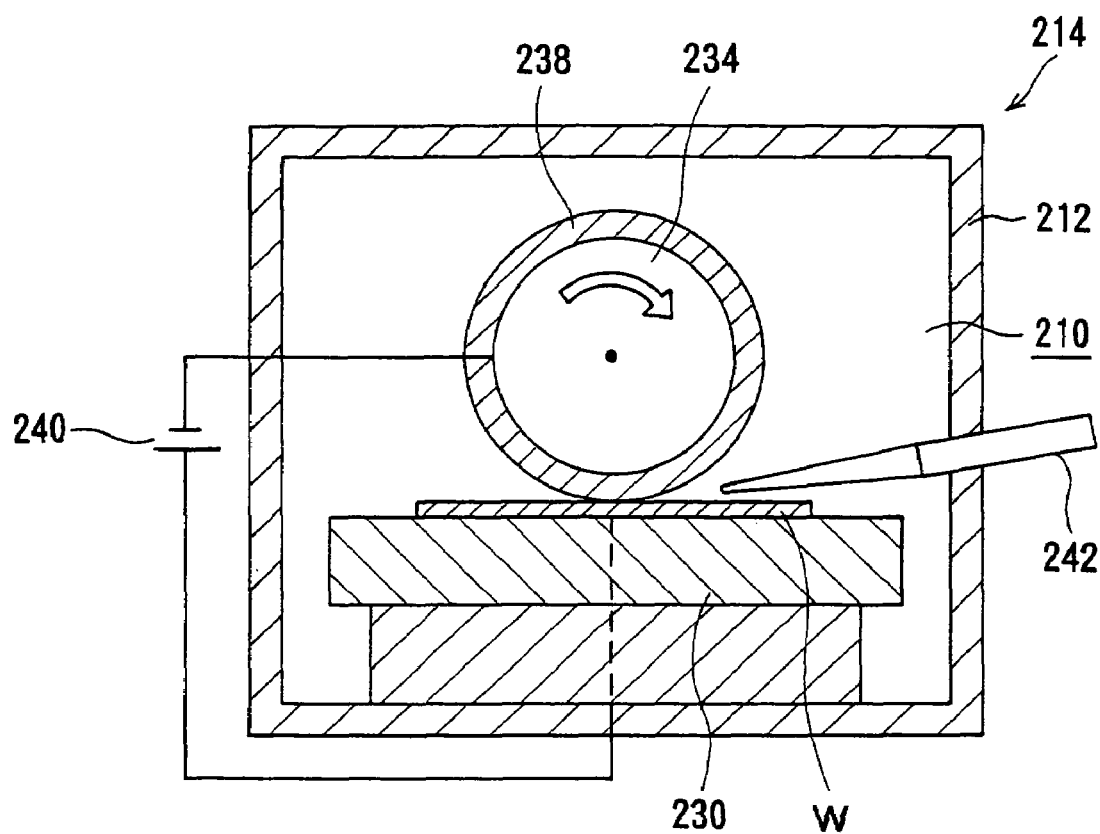
FIG. 12 is a vertical front view of the electrochemical machining apparatus shown in FIG. 11.
Figure 13:
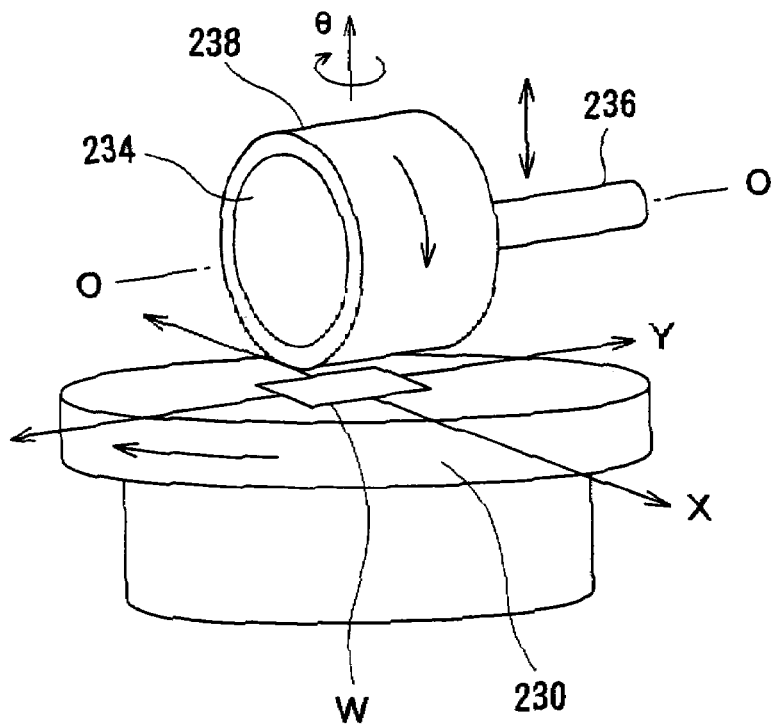
FIG. 13 is a perspective view showing a holding portion and a machining electrode in the electrochemical machining apparatus shown in FIG. 12.

FIGS. 11 through 13 are schematic views showing the whole construction of an electrochemical machining apparatus according to a third embodiment of the present invention. The electrochemical machining apparatus mainly comprises a main frame 214 having a machining chamber 212 for holding ultrapure water 210, an ultrapure water circulation/purification section 218 having a waste water tank 216, an ultrapure water circulation/purification device 222 and a high-pressure pump 220, and a high-pressure ultrapure water supply unit 228 having a plunger pump 224 and a pressure transmitter 226. For example, the machining chamber 212 is made of stainless steel.

As shown in FIGS. 12 and 13, the main frame 214 is disposed within the machining chamber 212 and has three degrees XYθ of freedom. The main frame 214 has the machining chamber 212 comprising a holding portion (holding table) for detachably holding a workpiece W such as a semiconductor wafer horizontally by vacuum chuck or the like. The workpiece W held by the holding portion 230 is horizontally movable in the directions of X, Y and is rotatable on the horizontal plane about the θ axis (Z axis) in such a state that the workpiece W is immersed in the ultrapure water 210. The holding portion 230 serves to hold the workpiece W and to supply an electric current to the workpiece W. For example, the holding portion 230 is made of titanium and has a platinum plated surface of 1 μm in thickness. The holding portion 230 is supported in the radial direction and in the thrust direction by a hydrostatic bearing 232 using the ultrapure water (see FIG. 11).

A columnar or cylindrical machining electrode (counter electrode) 234 is disposed above the holding portion 230, and a shaft center O-O of the machining electrode 234 is extended horizontally. The machining electrode 234 is coupled to a vertically movable rotating shaft 236 extended along the shaft center O-O. Accordingly, the machining electrode 234 can be rotated about the shaft center O-O in accordance with the rotation of the rotating shaft 236, and the distance between the machining electrode 234 and the workpiece W held by the holding portion 230 can be adjusted. For example, the machining electrode 234 is made of stainless steel and has a platinum plated surface of 1 μm in thickness in order to stabilize an electrolytic reaction and to prevent impurities from being eluted into the ultrapure water. As with the holding portion 230, the rotating shaft 236 is supported in the radial direction and in the thrust direction by a hydrostatic bearing (not shown) using the ultrapure water.

An ion exchange material 238 as a catalyst for dissociating water molecules of the ultrapure water 210 into hydrogen ions and hydroxide ions between the machining electrode 234 and the workpiece W is mounted on the circumferential surface of the body of the machining electrode 234 so as to be brought into close contact with the circumferential surface of the body. The ion exchange material (catalyst) 238 comprises a nonwoven fabric having an anion exchange function or a cation exchange function, for example. The cation exchange material should preferably have a strongly acidic cation exchange group (sulfonic acid group). Alternatively, the cation exchange material may have a weakly acidic cation exchange group (carboxyl group). On the other hand, the anion exchange material should preferably have a strongly basic anion exchange group (quaternary ammonium group). Alternatively, the anion exchange material may have a weakly basic anion exchange group (tertiary or lower ammonium group).

For example, the nonwoven fabric having a strongly basic anion exchange function can be prepared as follows: Graft chains are introduced into a polyolefin nonwoven fabric having a fiber diameter of 20 to 50 μm and a porosity of about 90% with the use of the so-called radiation-induced graft polymerization, which comprises the gamma irradiation and the graft polymerization. Then, the introduced graft chains are aminated to introduce the quaternary ammonium group for thereby forming a nonwoven fabric having a strongly basic anion exchange function. The capacity of the introduced ion exchange group is determined according to the amount of graft chain introduced. The ion exchange capacity of this nonwoven fabric is 1 to 1.45 meq/g, for example. A cloth made of strongly basic anion exchange fibers or a net into which a strongly basic anion exchange group is introduced can be used as the catalyst member.

On the other hand, the nonwoven fabric having a strongly acidic cation exchange function can be prepared as follows:. Graft chains are introduced into a polyolefin nonwoven fabric having a fiber diameter of 20 to 50 μm and a porosity of about 90% with the use of the so-called radiation-induced graft polymerization, which comprises the gamma irradiation and the graft polymerization. Then, the introduced graft chains are sulfonated to introduce the sulfonic acid group for thereby forming a nonwoven fabric having a strongly acidic cation exchange function. The ion exchange capacity of this nonwoven fabric was 2.8 meq/g, for example.

In general, the machining electrode 234 is lowered to perform electrochemical machining in such a state that the lower end of the machining electrode 234 is brought into contact with the surface of the workpiece W held by the holding portion 230. Alternatively, according to the purpose of machining and the properties of the workpiece W, the electrochemical machining may be performed in such a state that the workpiece W is separated from the ion exchange material 238 to form a space between the ion exchange material 238 and the workpiece W. Further, the ion exchange material 238 may be mounted on the workpiece W, and the machining electrode 234 is separated from the ion exchange material 238 to form a space between the ion exchange material 238 and the machining electrode 234.

The electrochemical machining apparatus further comprises a power source 240 for applying a voltage between the machining electrode 234 and the workpiece W held by the holding portion 230. In this embodiment, for example, in order to electropolish copper as the workpiece W, the machining electrode 234 is connected to the cathode of the power source 240, and workpiece (copper) W is connected to the anode of the power source 240. However, according to the type of workpieces, the machining electrode 234 may be connected to the anode of the power source 240, and the workpiece (copper) W may be connected to the cathode of the power source 240.

The holding portion 230 is constructed so as to be rotated about the vertical axis. The machining electrode 234 is constructed so as to be rotated about the horizontal axis. In this case, the holding portion 230 and the machining electrode 234 are rotated in such a manner that the ultrapure water 210 is revolved. An ultrapure water supply nozzle 242 for supplying the ultrapure water at high pressure between the workpiece W held by the holding portion 230 and the machining electrode 234 is disposed at the upstream side of the direction of the rotation. Thus, while at least one of the machining electrode 234 and the workpiece W is being rotated, the ultrapure water 210 is supplied between the machining electrode 234 and the workpiece W from the upstream side of the direction of rotation to effectively remove gas bubbles or machining products which stay between the machining electrode 234 and the workpiece W.

As shown in FIG. 11, waste water is purified by the ultrapure water circulation/purification device 222 in the ultrapure water circulation/purification section 218 and is pressurized and supplied from the pressure transmitter 226 in the high-pressure ultrapure water supply unit 228 through the plunger pump 224 into the ultrapure water supply nozzle 242.

Further, as shown in FIG. 11, the waste water 210 held in the machining chamber 212 overflows and is stored in the waste water tank 216. Then, the ultrapure water is purified in the ultrapure water circulation/purification device 222, and returned through the high-pressure pump 220 to the machining chamber 212. A portion of the ultrapure water 210 is supplied to the hydrostatic bearing 232.

With the electrochemical machining apparatus thus constructed, the workpiece W is held by the holding portion 230, and the machining electrode 234 is lowered to bring the ion exchange material 238 mounted around the machining electrode 234 into line contact with the surface of the workpiece W or to bring the ion exchange material 238 near the surface of the workpiece W. In this state, the ultrapure water 210 within the machining chamber 212 is purified by the ultrapure water circulation/purification device 222 to be circulated. The machining electrode 234 is connected to the cathode of the power source 240, and the workpiece W is connected to the anode of the power source 240, so that a voltage is applied between the electrodes 234 and the workpiece W. At this time, the holding portion 230 and the machining electrode 234 are simultaneously rotated in such a manner that the ultrapure water 210 is revolved. The ultrapure water is supplied between the machining electrode 234 and the workpiece W, at high pressure through the ultrapure water supply nozzle 242 disposed at the upstream side of the direction of rotation. Hydrogen ions and hydroxide ions are produced by dissociation of water molecule in the solid surface of the ion exchange material (catalyst) 238 to perform machining for removal. In this case, a flow of the ultrapure water 210 is formed in the machining chamber 212 and passed through the ion exchange material (nonwoven fabric) 238 to produce a large number of hydrogen ions and hydroxide ions, which are supplied onto the surface of the workpiece W to efficiently perform electrochemical machining.

As described above, the holding portion 230 and the machining electrode 234 are simultaneously rotated in such a manner that the ultrapure water 210 is revolved. The ultrapure water is supplied between the machining electrode 234 and the workpiece W, at high pressure through the ultrapure water supply nozzle 242 disposed at the upstream side of the direction of rotation. Accordingly, the ultrapure water 210 present between the workpiece W and the machining electrode 234 can effectively be replaced with new ultrapure water, so that gas and machining products produced upon machining can efficiently be removed from the machined surface to realize stable electrochemical machining.

Figure 14:
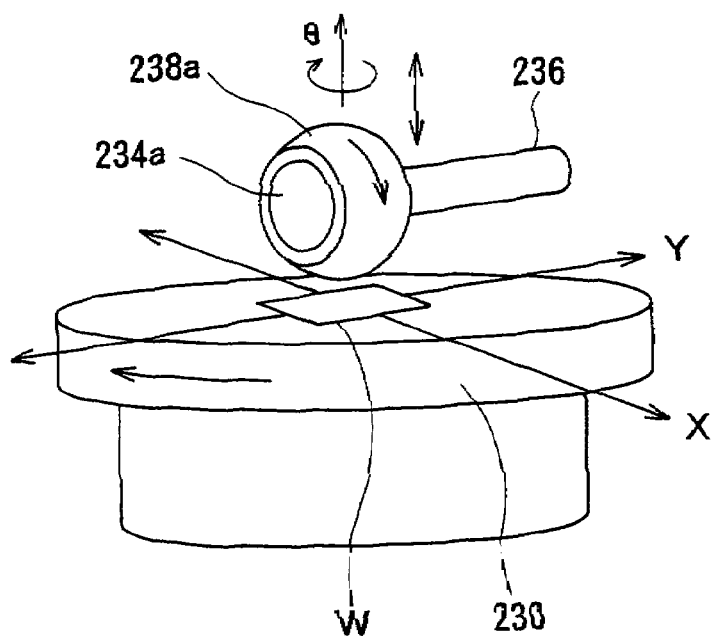
FIG. 14 is a perspective view showing a holding portion and a machining electrode in an electrochemical machining apparatus according to another embodiment of the present invention.

FIG. 14 is a perspective view showing an electrochemical machining apparatus according to another embodiment of the present invention. In this embodiment, a machining electrode 234a is ellipsoidal or spherical. Accordingly, when the machining electrode 234a is lowered, the lower portion of an ion exchange material 238a mounted on the surface of the machining electrode 234a is brought into point contact with the workpiece W held by the holding portion 230. In this state, the machining electrode 234a and the holding portion 230 are simultaneously rotated. The other construction is the same as the construction of the third embodiment described above.

According to this embodiment, since the area of the machining portion is reduced, the ultrapure water 210 can easily be supplied to a portion around the machining portion. Therefore, electrochemical machining can be performed under stable conditions.

According to the present invention, since any chemical material other than ultrapure water is not used, what contaminates the machining chamber 214 is only the reaction products produced in the machining process. Circulation of the ultrapure water can reduce the amount of wastewater. Further, since it is not necessary to treat chemical liquids, the operation cost can remarkably be reduced.

EXAMPLE 7

A copper plate was electrochemically machined with the electrochemical machining apparatus shown in FIGS. 11 through 13. A strongly acidic cation exchange fiber was used as an ion exchange material (catalyst) 238. A machining electrode 234 having a diameter of 100 mm was rotated at a rotational speed of 60 rpm in such a state that a workpiece W was fixed. Electrochemical machining was performed at a current density of 133 m/cm² for one minute. At that time, ultrapure water was supplied between the machining electrode 234 and the workpiece W at high pressure from the upstream side of the direction of rotation of the machining electrode 234 through the ultrapure water supply nozzle 242. The average flow velocity of the high-pressure ultrapure water at the outlet of the ultrapure water supply nozzle 242 was 5.3 m/sec. The average machining depth under the above machining conditions was 1.5 μm.

For an experiment using the ultrapure water supply nozzle and an experiment not using the ultrapure water supply nozzle, the surface roughness (center line average height Ra) of the machined surface was measured in an area of 194 μm×258 μm, and the formation of etch pits and traces of the ion exchange fiber were measured with a phase shift interference microscope.

As a result, in the experiment not using the ultrapure water supply nozzle, the surface roughness of the machined surface was Ra=93 nm. In the experiment using the ultrapure water supply nozzle, the surface roughness of the machined surface was approximately halved and reduced to Ra=51 nm. Further, in the experiment not using the ultrapure water supply nozzle, a large number of etch pits and fiber traces of the ion exchange fiber were found in the machined surface. In the experiment using the ultrapure water supply nozzle, the machined surface had neither etch pits nor fiber traces.

EXAMPLE 8

A copper plate was electrochemically machined with the electrochemical machining apparatus shown in FIGS. 11 through 13 and the electrochemical machining apparatus shown in FIG. 14 under conditions listed in Table 7 below. Comparison of the surface roughness of the machined surface was carried out. In the electrochemical machining apparatus shown in FIGS. 11 through 13, a cylindrical electrode having a diameter of 100 mm was used as the machining electrode 234. On the other hand, in the electrochemical machining apparatus shown in FIG. 14, a spherical electrode having a diameter of 50 mm was used as the machining electrode 234a. These machining electrodes were rotated at a rotational speed of 20 to 250 rpm, and electrochemical machining was performed at a current density of 33 to 333 mA/cm². In these cases, the lowest surface roughness of the machined surface was Ra=51 nm (60 rpm, 133 mA/cm²) in the case of the electrochemical machining apparatus shown in FIGS. 11 through 13, and was 40 nm (120 rpm, 133 mA/cm²) in the case of the electrochemical machining apparatus shown in FIG. 14.

In each of the above cases, an ultrapure water supply nozzle was used, and neither etch pits nor fiber traces were substantially found in the copper plate after the machining.

TABLE 7

| | |
|---|---|
| Workpiece | Copper Plate |
| Catalyst Material | Strongly Acidic Cation Exchange Fiber |
| Rotational Speed | 60 rpm |
| Current Density (Current Value) | 133 mA/cm² (1.0 A) |
| Average Machining Rate | 1.5 μm/min |
| Period of Voltage Application | 1 min |

EXAMPLE 9

A copper plate was electrochemically machined with the electrochemical machining apparatus shown in FIG. 14. In this case, the machining electrode 234a was rotated at a rotational speed of 120 rpm, and the machining was performed at a current density of 130 mA/cm² for one minute. Experiments were carried out in a case where the workpiece (copper plate) W was not rotated and in a case where the workpiece (copper plate) W was rotated. Comparison of the surface roughness of the machined surface was carried out. In the experiment without rotation of the workpiece W, undulations were found along the direction of rotation of the machining electrode 234a, and the surface roughness was Ra=40 nm. On the other hand, in the experiment with rotation of the workpiece W at a rotational speed of 10 rpm, no undulation was found along the direction of rotation, and the surface roughness could be reduced to Ra=20 nm.

Further, other experiments were carried out with other combinations of the current density and the rotational speed of the machining electrode 234a. As a result, a machined surface having Ra=10 nm could be obtained under conditions where a rotational speed of the machining electrode 234a is 250 rpm, a current density 130 mA/cm², and a rotational speed of the workpiece W 10 rpm.

As described above, according to the present invention, the surface roughness of a machined surface, which is increased by undulations, etch pits, traces (machining traces) of ion exchange fiber, and the like, can be reduced to improve accuracy of machining a workpiece.

In the embodiments described above, an ion exchange material has a strongly basic anion exchange group or a strongly acidic cation exchange group. However, an ion exchange material may have a weakly basic anion exchange group (for example, a tertiary or lower ammonium group) or a weakly acidic cation exchange group (for example, a carboxyl group).

Although certain preferred embodiments of the present invention have been shown and described in detail, it should be understood that various changes and modifications may be made therein without departing from the scope of the appended claims.

What is claimed is:

1. An electrochemical machining apparatus comprising:
an anode for machining a workpiece;
a workpiece holding portion for holding the workpiece as a cathode so as to form a predetermined space between the workpiece and said anode;
a catalyst disposed between the workpiece and said anode for dissociating water molecules into hydrogen ions and hydroxide ions;
an ultrapure water supply unit for supplying ultrapure water between said anode and the workpiece; and
a power source for applying a voltage between the workpiece and said anode.

2. The electrochemical machining apparatus as recited in claim 1, further comprising a moving mechanism for relatively moving the workpiece and said anode while the voltage is applied by said power source.

3. The electrochemical machining apparatus as recited in claim 1, wherein said catalyst comprises a basic anion exchange group.

4. The electrochemical machining apparatus as recited in claim 1, wherein said catalyst comprises an acidic cation exchange group.

5. An electrochemical machining apparatus comprising:
a machining electrode for machining a workpiece;
a workpiece holding portion for holding the workpiece to form a predetermined space between said machining electrode and the workpiece;
a catalyst disposed between said machining electrode and the workpiece for dissociating water molecules into hydrogen ions and hydroxide ions;
a power source for applying a voltage between said machining electrode and the workpiece; and
an ultrapure water supply unit for supplying ultrapure water between said machining electrode and the workpiece while said machining electrode is being rotated,
wherein said machining electrode has a rotating shaft parallel to a surface of the workpiece.

6. An electrochemical machining apparatus comprising:
a machining electrode for machining a workpiece;
a workpiece holding portion for holding the workpiece so as to form a predetermined space between said machining electrode and the workpiece;
a catalyst disposed between said machining electrode and the workpiece for dissociating water molecules into hydrogen ions and hydroxide ions; and
a power source for applying a voltage between said machining electrode and the workpiece,
wherein one of said machining electrode and the workpiece held by said workpiece holding portion is rotated while said catalyst and the workpiece are brought into line contact with each other.

7. The electrochemical machining apparatus as recited in claim 6, wherein said machining electrode has a rotating shaft parallel to a surface of the workpiece.

8. An electrochemical machining apparatus comprising:
a machining electrode for machining a workpiece;
a workpiece holding portion for holding the workpiece so as to form a predetermined space between said machining electrode and the workpiece;
a catalyst disposed between said machining electrode and the workpiece for dissociating water molecules into hydrogen ions and hydroxide ions; and
a power source for applying a voltage between said machining electrode and the workpiece,
wherein one of said machining electrode and the workpiece held by said workpiece holding portion is rotated while said catalyst and the workpiece are brought into point contact with each other.

9. The electrochemical machining apparatus as recited in claim 8, wherein said machining electrode has a rotating shaft parallel to a surface of the workpiece.

10. An electrochemical machining apparatus comprising:
a machining electrode for machining a workpiece;
a workpiece holding portion for holding the workpiece;
a catalyst disposed between said machining electrode and the workpiece for dissociating water molecules into hydrogen ions and hydroxide ions;
a power source for applying a voltage between said machining electrode and the workpiece; and
an ultrapure water supply nozzle for supplying high pressure ultrapure water between said machining electrode and the workpiece from the upstream side of a direction of rotation of at least one of said machining electrode and the workpiece in such a manner that the high pressure ultrapure water is revolved while at least one of said machining electrode and the workpiece held by said workpiece holding portion is being rotated.

11. The electrochemical machining apparatus as recited in claim 10, wherein the high pressure ultrapure water is passed through said catalyst.

12. The electrochemical machining apparatus as recited in claim 10, wherein said catalyst comprises a nonwoven fabric having an ion exchange function.

13. The electrochemical machining apparatus as recited in claim 10, wherein said catalyst comprises a strongly basic anion exchange group.

14. The electrochemical machining apparatus as recited in claim 10, wherein said catalyst comprises a strongly acidic cation exchange group.

15. The electrochemical machining apparatus as recited in claim 10, wherein said catalyst is mounted on said machining electrode.

16. The electrochemical machining apparatus as recited in claim 10, wherein said catalyst is brought into contact with the workpiece during a machining process.

17. The electrochemical machining apparatus as recited in claim 10, wherein said machining electrode has a rotating shaft parallel to a surface of the workpiece.

* * * * *